United States Patent [19]

Zongor et al.

[11] Patent Number: 4,781,432
[45] Date of Patent: Nov. 1, 1988

[54] OPTICAL FIBRE TRANSMISSION CABLE REINFORCEMENT

[75] Inventors: Zoltan Zongor; Drago Santrach, both of Guelph, Canada

[73] Assignee: Fiberglas Canada Ltd., Canada

[21] Appl. No.: 286,991

[22] Filed: Jul. 27, 1981

Related U.S. Application Data

[63] Continuation of Ser. No. 50,892, Jun. 21, 1979, abandoned.

[30] Foreign Application Priority Data

Jun. 1, 1979 [CA] Canada ........................... 328888

[51] Int. Cl.$^4$ ............................................. G02B 6/44
[52] U.S. Cl. ................................................ 350/96.23
[58] Field of Search ............... 350/96.23, 96.29, 96.34

[56] References Cited

U.S. PATENT DOCUMENTS

| | | | |
|---|---|---|---|
| 3,883,218 | 5/1975 | Slaughter | 350/96.23 |
| 3,887,265 | 6/1975 | Margolis et al. | 350/96.23 |
| 4,169,657 | 10/1979 | Bedard | 350/96.23 |
| 4,381,140 | 4/1983 | van der Hock et al. | 350/96.23 |

FOREIGN PATENT DOCUMENTS

| | | | |
|---|---|---|---|
| 2505621 | 8/1975 | Fed. Rep. of Germany | 350/96.23 |
| 2511019 | 9/1976 | Fed. Rep. of Germany | 350/96.23 |
| 2509547 | 10/1976 | Fed. Rep. of Germany | 350/96.23 |

*Primary Examiner*—William L. Sikes
*Assistant Examiner*—Robert E. Wise
*Attorney, Agent, or Firm*—Sughrue, Mion, Zinn, Macpeak & Seas

[57] ABSTRACT

An optical fibre transmission cable has a prestressed reinforcement which has a tensile modulus of $(4-6) \times 10^6$ psi, a flex modulus of $(1.0-5.7) \times 10^6$ psi and a thermal coefficient of linear expansion of approximately $2.8 \times 10^{-6}/°F$. and comprises a glass fibre roving saturated with synthetic resin material and held under tension by the synthetic resin material. The reinforcement and an optical fibre are provided within a synthetic resin material sheathing and the reinforcement provides the required mechanical reinforcement properties without introducing electrically conductive material into the cable. A method of making the reinforcement and the cable is also disclosed.

36 Claims, 7 Drawing Sheets

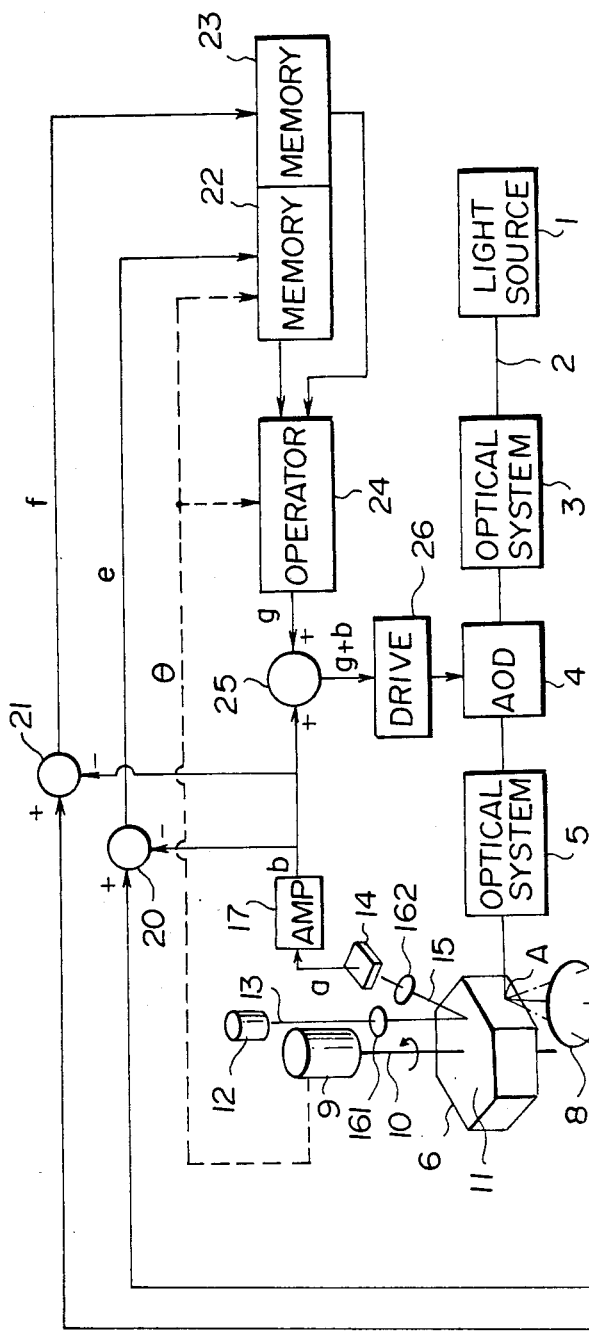
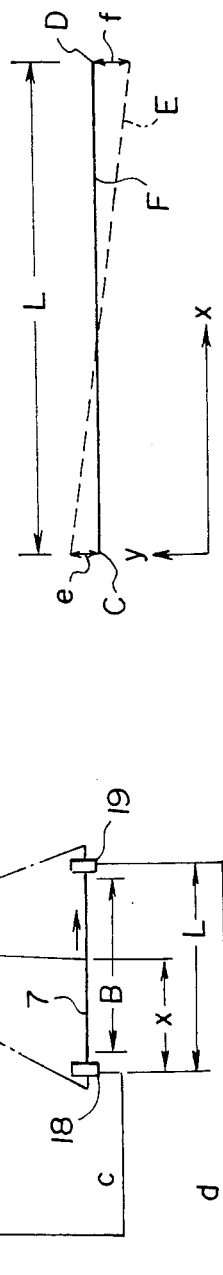

4,781,432

OPTICAL FIBRE TRANSMISSION CABLE REINFORCEMENT

This is a contination of patent application Ser. No. 050,892 filed June 21, 1979, now abandoned.

FIELD OF THE INVENTION

The present invention relates to optical fibre transmission cables provided with reinforcements, to reinforcements for such cables and to methods of making the reinforcements and the cables.

BACKGROUND OF THE INVENTION

Optical fibre transmission cables generally comprise one or more optical transmission fibres provided with one or more sheathings of synthetic resin material.

In addition, in order to provide the required mechanical strength, such cables are also provided with so-called strength members as a reinforcement.

More particularly, optical fibre transmission cables are inevitably subjected to tensile loads during the manufacture, handling, installation and, in some cases, the service life of the cables. For example, when such cables are strung in suspension from towers or the like, or when they are installed in ducts, it is necessary to exert substantial pulling forces on the cables. Also, strung cables are subject to tensile loads as a result of the weight of the cables themselves and also atmospheric conditions such as wind, ice etc.

Therefore, optical fibre transmission cables are provided with reinforcements to take up such loads in order to prevent breakage of the relatively weak optical fibres.

The provision of this reinforcement presents various difficulties. For example, if the reinforcement is required to be of an electrically non-conductive nature so as to avoid a danger of lightning strikes when the cables are freely suspended, then electrically conductive metal reinforcements such as aluminum and steel are not suitable for this purpose.

It has previously been proposed to provide, in an optical transmission cable, non-metallic strength members in the form of helically laid Kevlar aramid yarn, covered by a wrap of PTFE tape (see e.g. Modern Plastics, July 1978, pp. 38–41 and Design Engineering, March 1979). A jacket or sheathing of one or more layers of suitable material, e.g. polyethylene, is provided around the strength members.

However, a disadvantage of the use of Kevlar aramid yarn, which is a yarn made of highly oriented aramid fibre and is therefore flexible, and indeed a disadvantage of any flexible fibre yarn when used for optical fibre transmission cable reinforcement is that when it is provided with a sheathing of synthetic resin material, the latter shrinks as it is cured. This shrinkage causes the reinforcement to buckle. Consequently, when the cable is subjected to a tensile load, the load is not immediately taken up by the reinforcement. Instead, there is a lag, until the backlog of the reinforcement is taken up, which allows at least part of the load to be exerted on the optical fibre or fibres of the cable.

The present invention is based on the concept that the reinforcement should be prestressed and, more particularly, should comprise fibres which are held permanently under tension, so that, when in use, tensile loads are immediately taken up, without any lag, by the reinforcement.

OBJECT OF THE INVENTION

It is accordingly an object of the present invention to provide, for an optical fibre transmission cable, a novel and improved cable reinforcement.

BRIEF SUMMARY OF THE INVENTION

According to the present invention, there is provided a reinforcement for an optical fibre transmission cable, the reinforcement comprising a roving of glass fibre material; and a cured synthetic resin saturating the roving; the roving being held under tension by the cured synthetic resin, whereby the roving is prestressed; the reinforcement having a tensile modulus of $(4-6) \times 10^6$ psi and a flex modulus of $(1.0-5.7) \times 10^6$ psi.

When in use, the reinforcement may for example extend along or parallel to the longitudinal axis of the cable and be bonded to an extruded sheathing.

The reinforcement may, for example, extend along the centre of the cable, a plurality of optical fibres being unformly distributed around and radially outwardly spaced from the reinforcement. More particularly, in this case, the sheathing may be formed with longitudinal external recesses receiving the optical fibres, further sheathing of synthetic resin material being provided around the optical fibres and the first-mentioned sheathing.

Alternatively, the reinforcement can be helically wound around a core comprising one or more optical transmission fibres and the sheathing.

The present invention also provides a method of making a reinforcement for an optical fibre transmission cable, comprising the steps of placing a glass fibre roving under tension; saturating the tensioned glass fibre roving with a liquid synthetic resin; passing the saturated glass fibre roving through an opening to remove any excess of the liquid synthetic resin therefrom; and curing the liquid synthetic resin while the glass fibre roving is maintained under tension.

BRIEF DESCRIPTION OF THE DRAWINGS

The invention will be more readily understood from the following description of preferred embodiments thereof given, by way of example, with reference to the accompanying drawing, in which:

FIG. 1 shows a side view of an optical fibre transmission cable with components thereof stripped away in succession;

FIG. 2 shows a view taken in cross-section along the line II—II of the cable of FIG. 1;

DESCRIPTION OF PREFERRED EMBODIMENTS

Figure 3:
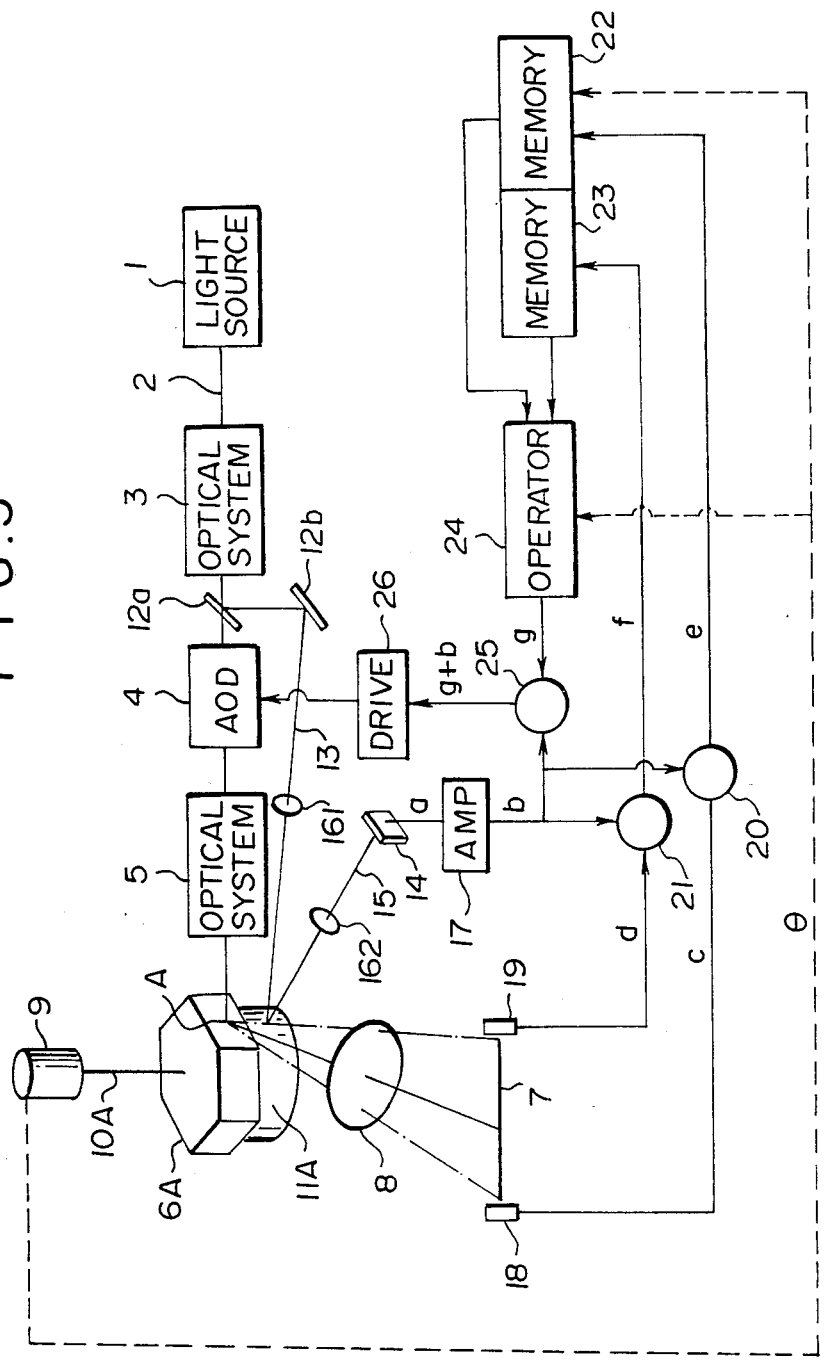
FIG. 3 shows diagrammatically a production line for the manufacture of the cable shown in FIG. 1.

The embodiment of the invention illustrated in FIGS. 1 and 2 is an optical fibre transmission cable indicated generally by reference numeral 10.

The core of the cable 10 is a continuous elongate reinforcement 11 in the form of a roving of glass fibres saturated by a cured polyester resin.

The reinforcement 11 extends along the centre of an inner sheathing 12 of cured synthetic resin material, and the reinforcement 11 is bonded, as described hereinafter, to the synthetic resin material of the inner sheathing 12.

The inner sheathing 12 is formed, on the exterior surface thereof, with eight longitudinal recesses 14, and eight optical transmission fibres 15 are accommodated in the recesses 14.

An external sheathing 16 of synthetic resin material extends around the optical fibres 15 and the inner sheathing 12.

FIG. 3 illustrates the successive steps of the manufacture of the cable 10 of FIGS. 1 and 2.

As shown in FIG. 3, a glass fibre roving 18 is fed from a supply reel 19 through a bath indicated generally by reference numeral 20.

Guide rollers 21 are provided for guiding the roving 18 through the bath 20, and more particularly through a liquid polyester resin 22 contained in the bath 20.

From the bath 20, the roving 18, now fully saturated by the liquid polyester resin 22, passes through an orifice plate 24, and more particularly through an orifice of circular shape provided in the orifice plate 24. The purpose of this orifice plate is to remove excess liquid polyester resin 22 from the roving 18.

Figure 4:
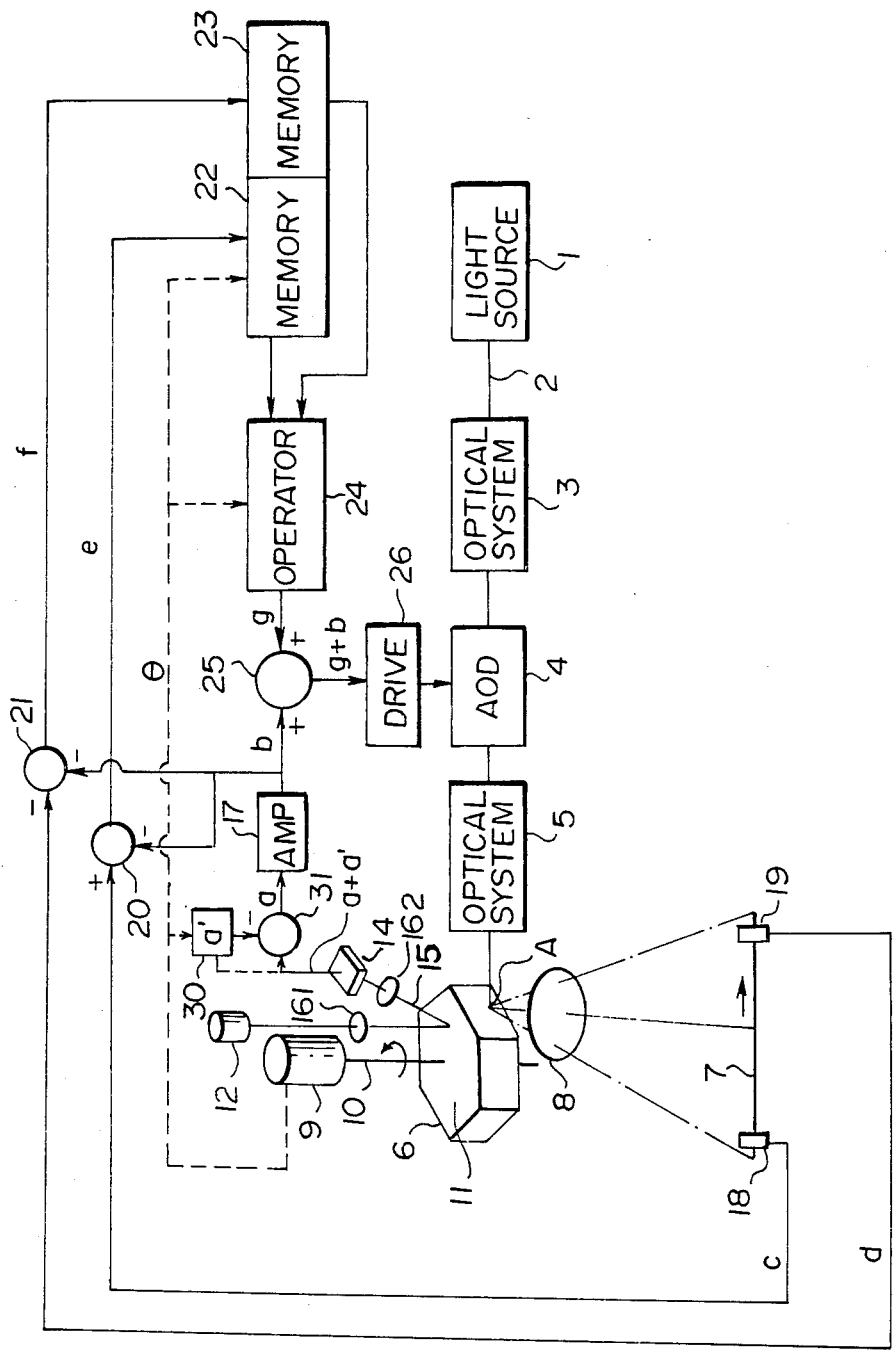
FIGS. 4, 5, and 6 show parts of the cable of FIG. 1 during successive steps of the production thereof.

The roving 18 and the remaining liquid polyester resin 22 saturating the roving 18 now pass through a curing oven 25, which cures and thereby hardens the polyeter resin, so that at this stage the roving 18 and the cured polyester resin form the reinforcement 11, the circular cross-section of which is diagrammatically illustrated in FIG. 4.

The roving 18 is pulled through the bath 20, and the orifice plate 24 and the curing oven 25 by pull rolls 26 acting on the reinforcement 11. Also, a tensioning or braking device 27 is provided between the supply reel 19 and the bath 20 for tensioning the roving 18.

Consequently, during its travel through the bath 20, the orifice plate 24 and the curing oven 25, the roving 18 is held under tension by the tensioning device 27, and also by the drag exerted by the orifice plate 24, and this tension, which in practice may amount to approximately 100-200 gms is maintained during the curing of the synthetic resin.

The reinforcement 11 is thus produced in a pre-stressed condition.

If required, the reinforcement 11 may, at this stage, be wound into a coil for storage and transportation, for example, to a different factory. However, for convenience of illustration, the reinforcement 11 is shown in FIG. 3 as passing directly from the curing oven 25 to an extrusion machine 28, although it will be understood that, in fact, the extrusion machine 28 may be remote from the curing oven 25.

Figure 5:
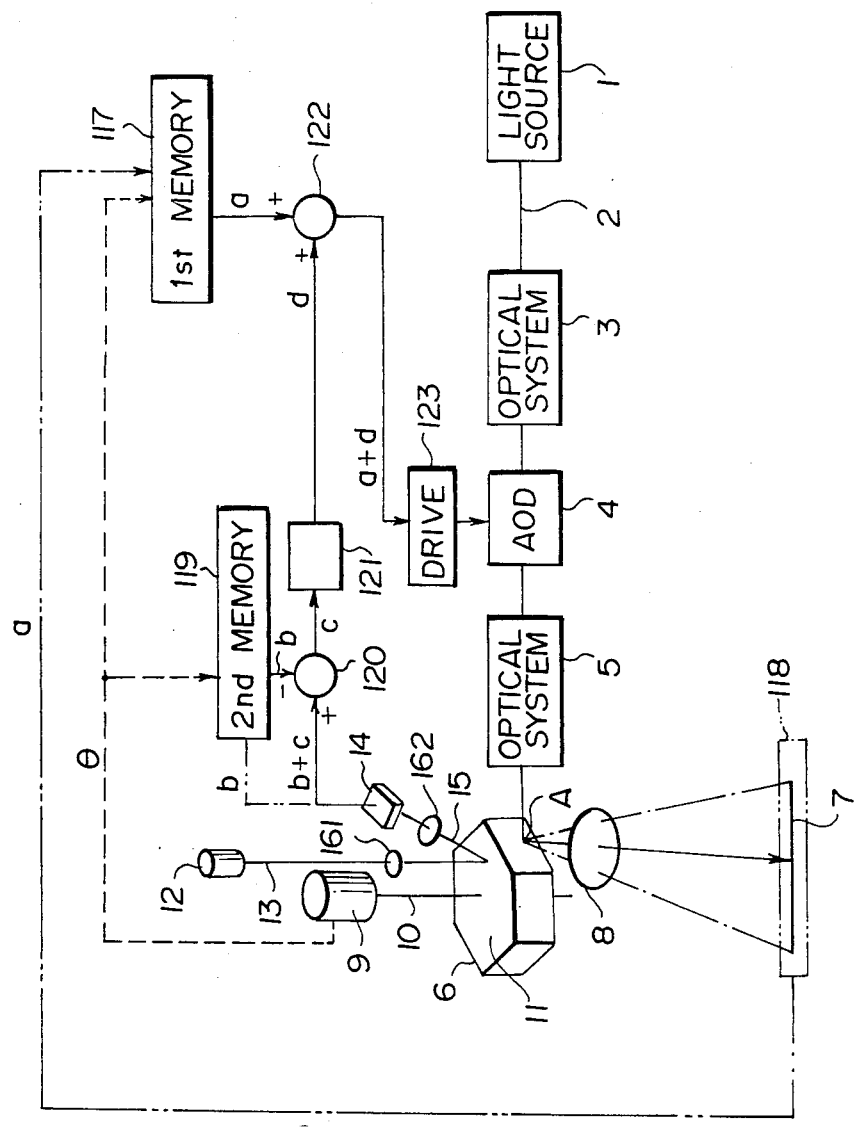

At the extrusion machine 28, the inner sheathing 12, formed with the longitudinal recesses 14, is extruded around the reinforcement 11, as illustrated in FIG. 5, and is then allowed to cool and thereby hardened, whereby the material of the sheathing shrinks onto the reinforcement.

A bonding of the sheathing to the reinforcement is produced primarily as a result of the shrinkage of the sheathing material onto the reinforcement 11.

Also, when the reinforcement is made as described above by pulling the saturated glass roving through a circular orifice and then curing, the reinforcement does not, in practice, have a smooth peripheral surface of uniformly circular cross-section but, on the contrary, has a rough surface and varies in cross-sectional shape along its length. This rough surface and the variation of the cross-sectional shape increase the bonding of the sheathing to the reinforcement.

However, it has been found that satisfactory results can be obtained by making the reinforcement 11 by the well-known pultrusion process, instead of by drawing the saturated glass fibre roving through an orifice, and that a good bonding of the sheathing to the reinforcement can still be obtained although, in this case, the reinforcement is smooth and of uniform cross-sectional shape.

If required, the reinforcement 11 jacketed in the sheathing 12 may at this stage be coiled for storage and transportation, for example to a different factory. However, for convenience of illustration FIG. 3 shows the reinforcement and the inner sheathing being fed directly to the next stage of the cable manufacturing process.

Figure 6:
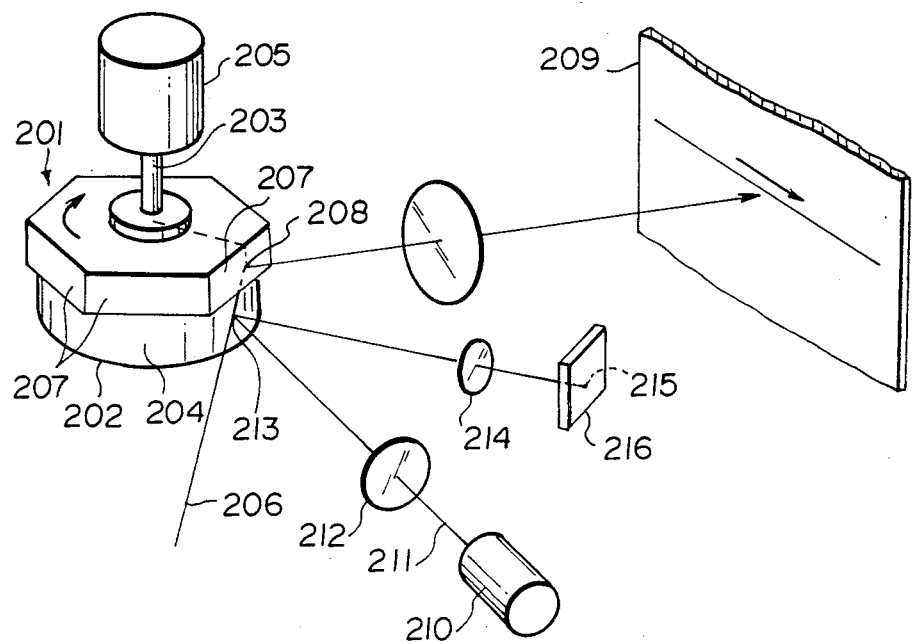

Referring again to FIG. 3, at the next stage, the optical transmission fibres 15 are fed from supply reels 29, and guided by rollers 30 so as to be deposited in the longitudinal recesses 14 of the sheathing 12, as illustrated in FIG. 6. These components then pass into a second extrusion machine 31, at which the external sheathing 16 is extruded around the optical transmission fibres 15 and the sheathing 12, and the external sheathing 16 is cooled and thereby hardened.

Thereafter, the completed cable 10 is guided around a guide roller 33 onto a take-up reel 34.

The reinforcement 11 has sufficient tensile strength to protect the optical transmission fibres 15 from tensile loads during the manufacture, installation and service of the optical fibre transmission cable.

More particularly, for this purpose the reinforcement 11 is manufactured with a tensile modulus in the range of $(4-6) \times 10^6$ psi and preferably has an ultimate tensile strength of 70,000–200,000 psi. The tensile modulus and the ultimate tensile strength of the reinforcement 11 are made as high as possible in order to minimize the amount of reinforcement required and thus to save space and costs. In this connection, it has been found that the reinforcement can conveniently be made and utilized with a diameter of 0.034 inch. However, the invention is by no means restricted to this diameter, since satisfactory results can certainly be obtained with other diameters. In fact, diameters of 0.020–0.070 inch have been successfully employed and this range could be extended upwardly to, for example, ⅛ inch.

The flexural properties required for the reinforcement vary in dependance on the specific type of construction of the cable and the sizes and material of the other components of the cable. However, in general the reinforcement is sufficiently stiff to resist buckling during the cooling of the extruded sheathing 12, but the reinforcement is also sufficiently flexible to permit coiling and installation of the cable.

The stiffness of the reinforcement can be controlled by appropriate determination of the percentages of glass fibre and synthetic resin in the reinforcement and by selection of the type of synthetic resin employed to saturate the glass fibres.

It has been found that satisfactory results are obtained, when the finished reinforcement has a flex modulus of $(1.0-5.7) \times 10^6$ psi and a flex strength at break of 25,000–140,000 psi.

The glass fibre content of the reinforcement is preferably 60–80% by weight.

Resin mixes employed in this reinforcement contained an unsaturated isophthalic based rigid polyester resin which was modified by addition of a saturated aliphatic acid containing flexible polyester resin. The degree of flexibility of the finished reinforcement was dependent on the ratio of these polyester resin and, in fact, resin mixes comprising from 100% unsaturated isophthalic resin to 100% saturated aliphatic acid containing resin have been employed. A mix of these resins and containing 20% of aliphatic acid containing resin has given particularly satisfactory results.

It should also be understood, however, that different thermoset materials could give different flexibility ranges, depending on their cross-link density, and the invention is not restricted to the resins mentioned above.

To minimize differential thermal expansion of the reinforcement 11 and the optical transmission fibres 15, and thus to reduce or even entirely eliminate internal stresses due to ambient temperature variations, the glass fibre of the reinforcement has a coefficient of linear thermal expansion which is as close as possible to that of the fibres 15 and which is therefore preferably of the order of $2.8 \times 10^{-6}/°F$.

Figure 7:
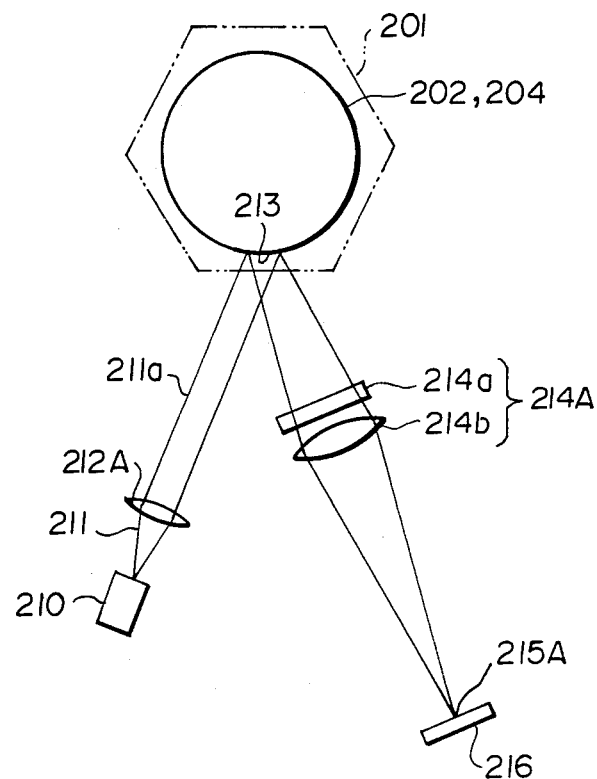
FIGS. 7, 8, 9, and 10 show views taken in cross-section through four modified cables embodying the present invention.

The modified cable shown in FIG. 7 and indicated generally by reference numeral 40 has a central core in the form of a reinforcement 41 which is similar to the reinforcement 11 of FIGS. 1 and 2. Sheathing 43 of synthetic resin material, having a circular cross-sectional periphery, surrounds both the reinforcement 41 and a plurality of optical transmission fibres 44.

Figure 8:
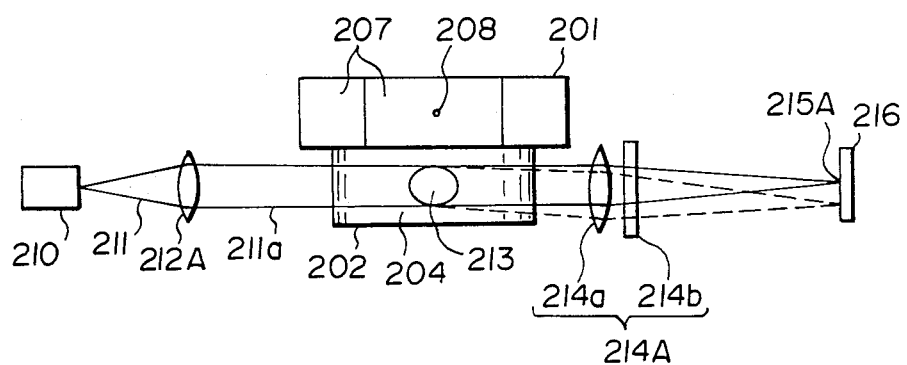

In the modified cable shown in FIG. 8, a single optical transmission fibre 50 forms the core of the cable and is embedded in a sheathing 51 of synthetic resin material, and a plurality of reinforcements 52 are also embedded in the sheathing 51, the reinforcements 52 being radially spaced from the optical transmission fibre 50 and being equi-angularly spaced from one another. If required, the single optical transmission fibre 50 may be replaced by a plurality of such fibres.

Figure 9:
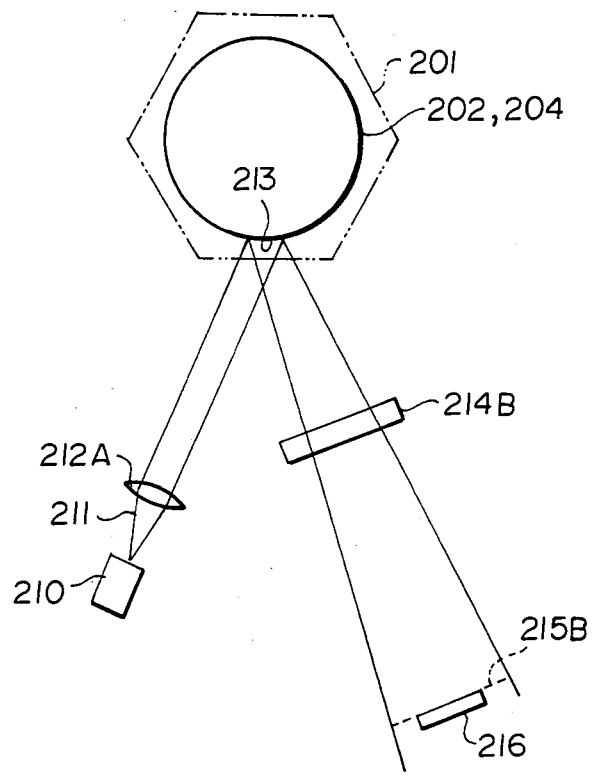

The cable illustrated in FIG. 9 has some resemblance to that of FIGS. 1 and 2. However, in the case of the cable shown in FIG. 9, the core of the cable is formed by an optical transmission fibre 61, which is surrounded by an inner sheathing 62 corresponding to the inner sheathing 12 of FIGS. 1 and 2.

Eight reinforcements 63 are accommodated in longitudinal external recesses in the outer periphery of the inner sheathing 62, and an outer sheathing 64 of synthetic resin material extends around the reinforcements 63 and the inner sheathing 62.

In each of the embodiments of the invention illustrated in FIGS. 7 to 10, the or each reinforcement is formed by a continuous glass fibre roving saturated by synthetic resin material and cured, as described hereinabove with reference to FIG. 3, or by the pultrusion process, and the or each reinforcement is bonded to the adjacent synthetic resin material sheathing, as also described hereinabove.

Figure 10:
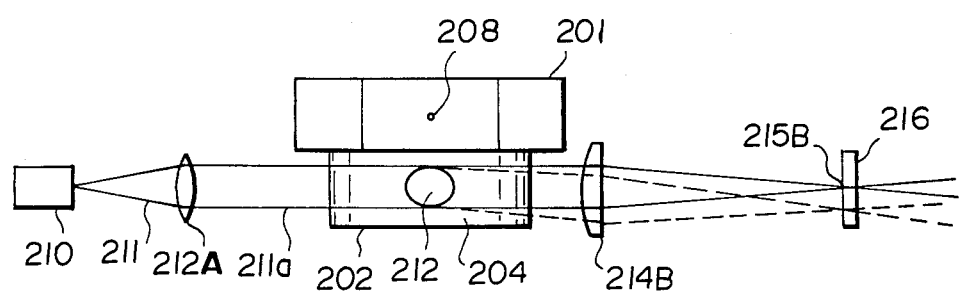

FIG. 10 shows a cable, indicated generally by reference numeral 70, having an axial optical transmission fibre 71 embedded in an inner sheathing 72 of synthetic resin material. In this case, eighteeen reinforcements 73a, 73b are helically wound against the inner sheathing 72, without being bonded thereto, to form a tight armour around the sheathing 72 and the optical transmission fibre 71 and to protect them against crushing during installation of the cable. The nine reinforcements 73a are wound in helices of opposite hand to those of the nine reinforcements 73b.

Two oppositely wound layers 74 of polyester adhesive tape are around the reinforcements and jacketed, in turn, by an extruded outer sheathing 75.

The tensile strength and the crush resistance of the cable shown in FIG. 10 are determined by (a) the flexibility of the reinforcements; (b) the number of the reinforcements; and (c) the helix angles at which the reinforcements are wound on the inner sheathing.

In connection with (c), as the helix angle is increased, the ability of the reinforcements to support tensile loads in the axial direction decreases.

Thus by correlating and predetermining the factors (a), (b) and (c), the effective tensile strength and crush resistance of the reinforcements can be preselected in accordance with requirements.

The reinforcements 73a, 73b are made as described above with reference to FIGS. 1 to 9 and are wound under tension onto the sheathing 72. After this winding operation, the reinforcements are maintained under tension by the sheathing.

Also, the helix angle of the reinforcements 73a is equal to that of the oppositely wound reinforcements 73b for symmetry.

In the above-described embodiments of the invention, the sheathings are of polyethylene. However, any other suitable material, e.g. thermoplastic elastomer, may be substituted therefor.

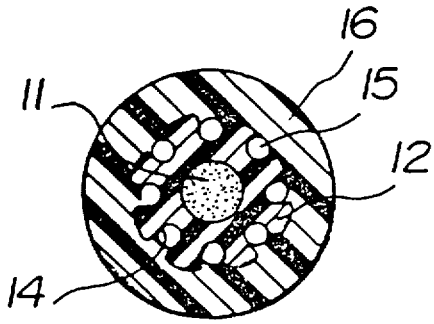

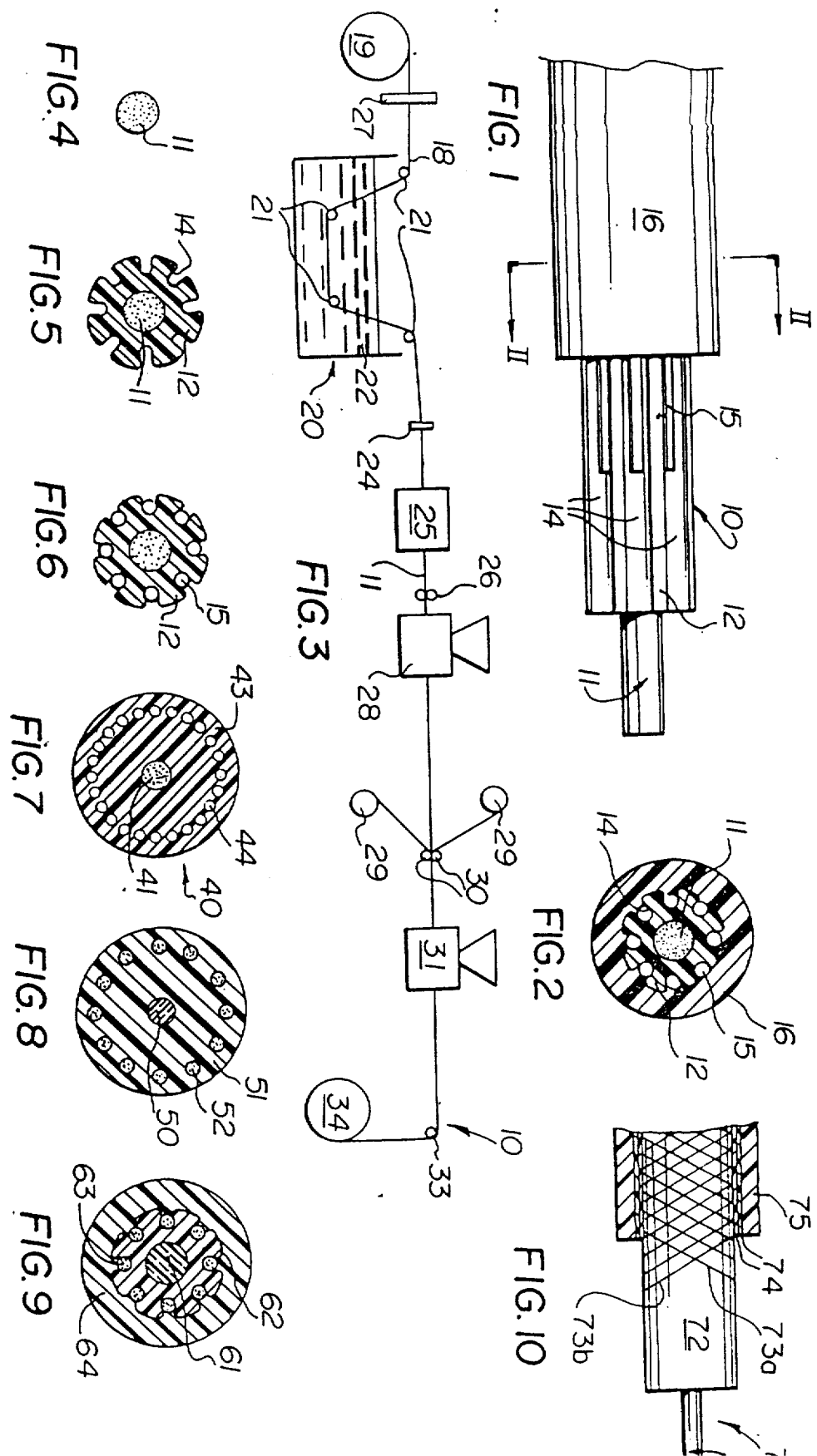

We claim:

1. In a method of making an optical fibre transmission cable which includes providing an optical transmission fibre and a sheathing of synthetic resin material, the improvement comprising the steps of:

firstly prefabricating at least one individual reinforcement by saturating a glass fibre roving with a synthetic resin such that said resin occupies the interstices between and coats the glass fibres of said roving;

curing said synthetic resin; and maintaining said roving under tensile stress during the curing of said synthetic resin to provide said individual reinforcement in a completely prefabricated condition, prior to the assembly thereof with any other component of said cable, as a separate cable component consisting of said roving and said cured synthetic resin, whereby said synthetic resin, when cured, maintains said roving in a pretensioned condition; and subsequently combining said reinforcement with said optical transmission fibre and said sheathing.

2. A method as claimed in claim 1, in which the step of combining said optical transmission fibre and said sheathing with said reinforcement comprises extruding said sheathing onto said reinforcement and then cooling said sheathing.

3. A method as claimed in claim 2, which includes forming a plurality of longitudinal circumferentially spaced external recessed in said sheathing, disposing an optical fibre in each of said recesses and forming another sheathing of synthetic resin material around said optical fibres.

4. A method as claimed in claim 1, in which the step of combining said optical transmission fibre and said sheathing with said reinforcement comprises forming said sheathing around said optical fibre and subsequently helically winding said reinforcement under tension around said sheathing.

5. A method as claimed in claim 1, which includes feeding said roving in succession through a bath of synthetic resin to saturate the roving, an orifice to remove excess resin from said roving and a curing oven to cure the resin remaining in and on said roving.

6. A method as claimed in claim 1, in which said synthetic resin comprises an unsaturated isophthalic based rigid polyester resin modified by the addition of a saturated aliphatic acid containing flexible polyester resin.

7. In a method of making an optical fibre transmission cable, the improvement comprising the steps of:
manufacturing a prefinished cable reinforcement separate from any other component of said cable by:
placing a glass fibre roving under tension;
saturating said tensioned glass fibre roving with a liquid synthetic resin such that said resin occupies the interstices between and coats the glass fibres of said roving;
passing said saturated glass fibre roving through an opening to remove any excess of said liquid synthetic resin therefrom; and
curing said liquid synthetic resin while said glass fibre roving is maintained under tension to form a separate individual reinforcement in which said roving is maintained in a pretensioned condition solely by said synthetic resin.

8. A method as claimed in claim 7, wherein said glass fibre roving comprises 60-80% by weight of said reinforcement.

9. A method as claimed in claim 7 or 8, wherein said synthetic resin comprises an unsaturated isophthalic based rigid polyester resin modified by a saturated aliphatic acid containing flexible polyester resin.

10. A separate individual reinforcement for an optical fibre transmission cable, said reinforcement being made separately from said cable for subsequent assembly with other components of said cable and comprising:
a prestressed roving of glass fibre material; and
a cured synthetic resin occupying the interstices between and coating the glass fibres of said glass fibre material;
said roving being maintained in said prestressed condition solely by said cured synthetic resin; and
said reinforcement having a tensile modulus of $(4-6) \times 10^6$ psi and a flex modulus of $(1.0-5.7) \times 10^6$ psi.

11. A reinforcement as claimed in claim 10, having an ultimate tensile strength of 70,000 to 200,000 psi.

12. A reinforcement as claimed in claim 11, having a thermal co-efficient of linear expansion of substantially $2.8 \times 10^{-6}/°F$.

13. A reinforcement as claimed in claim 10, having a thermal co-efficient of linear expansion of substantially $2.8 \times 10^{-6}/°F$.

14. A reinforcement as claimed in claim 10, 11 or 13, comprising 60 to 80% by weight of said glass fibre roving.

15. A reinforcement as claimed in claim 10, 11 or 13, wherein said synthetic resin comprises an unsaturated isophthalic based polyester resin modified by the addition of a saturated aliphatic acid containing polyester resin.

16. An optical fibre transmission cable, comprising:
at least one optical fibre;
at least one individually preformed continuous elongate prestressed reinforcement;
said reinforcement comprising a prestressed roving of glass fibres having a cured synthetic resin occupying the interstices between and coating said glass fibres such that said resin independently maintains the roving in said prestressed condition;
said reinforcement having a tensile modulus of $(4-6) \times 10^6$ psi; and
at least one sheathing of synthetic resin material extruded around said optical fibre and said reinforcement.

17. An optical fibre transmission cable as claimed in claim 16, wherein said reinforcement has an ultimate tensile strength of 70,000 to 200,000 psi.

18. An optical fibre transmission cable as claimed in claim 16 or 17, wherein said optical fibre extends along the centre of said cable and said reinforcement is one of a plurality of similar reinforcements uniformly distributed around and radially outwardly spaced from said optical fibre.

19. An optical fibre transmission cable as claimed in claim 18, wherein sadi sheathing is a first sheathing surrounding a second sheathing, which in turn surrounds said optical fibre, said second sheathing being formed with a plurality of longitudinal external recesses respectively receiving said optical fibres between said first and second sheathings, said second sheathing comprising a synthetic resin material.

20. An optical fibre transmission cable as claimed in claim 16 or 2, wherein said reinforcement has a flex modulus of $(1.0-5.7) \times 10^6$ psi.

21. An optical fibre transmission cable as claimed in claim 16 or 2, wherein said reinforcement comprises 60 to 80% by weight of glass fibres.

22. An optical fibre transmission cable as claimed in claim 16, wherein said resin comprises a polyester resin.

23. An optical fibre transmission cable as claimed in claim 16, wherein said reinforcement has a thermal co-efficient of linear expansion substantially equal to that of said optical fibre.

24. An optical fibre transmission cable as claimed in claim 23, wherein said reinforcement has a thermal co-efficient of linear expansion of approximately $2.8 \times 10^{-6}/°F$.

25. An optical fibre transmission cable as claimed in claim 16, wherein said reinforcement extends along the centre of said cable, and said optical fibre is one of a plurality of optical fibres uniformly distributed around and radially outwardly sapced from said reinforcement.

26. An optical fibre transmission cable as claimed in claim 25, wherein said sheathing is a first sheathing surrounding said reinforcement and formed with a plurality of longitudinal external recesses respectively receiving said optical fibres and a second sheathing of synthetic resin material extends around said optical fibres and said first sheathing.

27. An optical fibre transmission cable as claimed in claim 25, wherein said optical fibres and said reinforcement are embedded in said sheathing.

28. An optical transmission cable, comprising:
a core;
said core comprising a continuous elongate individually preformed prestressed reinforcement;
said reinforcement comprising a prestressed roving of glass fibres having a cured synthetic resin occupying the interstices between and coating said glass fibres such that said synthetic resin maintains the roving in said prestressed condition;

a first sheathing of synthetic resin material extruded around said core and shrink-bonded thereto;

a plurality of optical fibres distributed around said first sheathing; and a second sheathing of synthetic resin material extruded around said optical fibres and said first sheathing.

29. An optical fibre transmission cable, comprising:

at least one optical fibre;

a first sheathing of synthetic resin material formed around said at least one optical fibre;

a plurality of separate individually prestressed and precured reinforcements disposed under tension about said first sheathing;

said separate individual reinforcements each comprising a pretensioned roving of glass fibres having a cured synthetic resin material occupying the interstices between and coating said glass fibres such that said resin independently maintains said roving in its pretensioned condition;

said reinforcements having a tensile modulus of $(4-6) \times 10^6$ psi; and a second sheathing of synthetic resin material formed around said reinforcements and said first sheathing.

30. An apparatus as claimed in claim 29, wherein said plurality of reinforcements are helically wound around said first sheathing in alternate helical directions.

31. In a method of manufacturing an optical fibre transmission cable, the improvement comprising the steps of:

prefabricating at least one individually preformed reinforcement separate from any other component of said cable by saturating a glass fibre roving with a synthetic resin and curing said resin; and subsequently assembling said reinforcement with said other components of said cable.

32. A method as claimed in claim 31, which includes passing said roving, subsequent to the saturation thereof and prior to the curing of said resin, through an orifice to remove excess resin from said roving.

33. In an optical fibre transmission cable comprising an optical fibre and a sheathing around said optical fibre, the improvement commprising at least one separately prefabricated and individually preformed reinforcement within said sheathing, said reinforcement comprising a roving of glass fibres and a cured synthetic resin saturating and coating said roving, wherein said sheathing is in extruded enveloping shrink-bonded engagement with said reinforcement.

34. In a method of making an optical fibre transmission cable, the improvement comprising the steps of:

manufacturing a prefabricated cable reinforcement by:

placing a glass fibre roving under tension;

saturating said tensioned glass fibre roving with a liquid synthetic resin such that said resin occupies the interstices between and coats the glass fibres of said roving;

passing said saturated glass fibre roving through an opening to remove any excess of said liquid synthetic resin therefrom; and curing said liquid synthetic resin while said glass fibre roving is maintained under tension to form a completed separate individual reinforcement independently of any other component of the cable; and subsequently combining said prefabricated, preformed reinforcement with other components of said cable.

35. A method as claimed in claim 34, wherein the step of combining said reinforcement with other components of said cable includes providing a sheathing around said reinforcement so that said reinforcement forms a central core within said sheathing.

36. A method as claimed in claim 35, which includes extruding said sheathing as an inner sheathing around said reinforcement with a plurality of longitudinal recesses in said sheathing, disposing optical fibres in said longitudinal recesses and subsequently extruding an outer sheathing around said inner sheathing and said optical fibres.

* * * * *

UNITED STATES PATENT AND TRADEMARK OFFICE
CERTIFICATE OF CORRECTION

PATENT NO. : 4,781,432

DATED : November 1, 1988

INVENTOR(S) : ZONGOR et al.

It is certified that error appears in the above-identified patent and that said Letters Patent is hereby corrected as shown below:

The Title Page and 7 Drawing Sheets should be deleted and substitute the attached Title Page and Sheet of Drawing, therefor.

Signed and Sealed this

Twelfth Day of September, 1989

Attest:

DONALD J. QUIGG

Attesting Officer

Commissioner of Patents and Trademarks

United States Patent [19]

Zongor et al.

[11] Patent Number: 4,781,432
[45] Date of Patent: Nov. 1, 1988

[54] OPTICAL FIBRE TRANSMISSION CABLE REINFORCEMENT

[75] Inventors: Zoltan Zongor; Drago Santrach, both of Guelph, Canada

[73] Assignee: Fiberglas Canada Ltd., Canada

[21] Appl. No.: 286,991

[22] Filed: Jul. 27, 1981

Related U.S. Application Data

[63] Continuation of Ser. No. 50,892, Jun. 21, 1979, abandoned.

[30] Foreign Application Priority Data

Jun. 1, 1979 [CA] Canada ............................. 328888

[51] Int. Cl.⁴ .................................................. G02B 6/44
[52] U.S. Cl. ........................................................ 350/96.23
[58] Field of Search ................ 350/96.23, 96.29, 96.34

[56] References Cited

U.S. PATENT DOCUMENTS

| | | | |
|---|---|---|---|
| 3,883,218 | 5/1975 | Slaughter | 350/96.23 |
| 3,887,265 | 6/1975 | Margolis et al. | 350/96.23 |
| 4,169,657 | 10/1979 | Bedard | 350/96.23 |
| 4,381,140 | 4/1983 | van der Hock et al. | 350/96.23 |

FOREIGN PATENT DOCUMENTS

| | | | |
|---|---|---|---|
| 2505621 | 8/1975 | Fed. Rep. of Germany | 350/96.23 |
| 2511019 | 9/1976 | Fed. Rep. of Germany | 350/96.23 |
| 2509547 | 10/1976 | Fed. Rep. of Germany | 350/96.23 |

*Primary Examiner*—William L. Sikes
*Assistant Examiner*—Robert E. Wise
*Attorney, Agent, or Firm*—Sughrue, Mion, Zinn, Macpeak & Seas

[57] ABSTRACT

An optical fibre transmission cable has a prestressed reinforcement which has a tensile modulus of $(4-6) \times 10^6$ psi, a flex modulus of $(1.0-5.7) \times 10^6$ psi and a thermal coefficient of linear expansion of approximately $2.8 \times 10^{-6}/°F$. and comprises a glass fibre roving saturated with synthetic resin material and held under tension by the synthetic resin material. The reinforcement and an optical fibre are provided within a synthetic resin material sheathing and the reinforcement provides the required mechanical reinforcement properties without introducing electrically conductive material into the cable. A method of making the reinforcement and the cable is also disclosed.

36 Claims, 1 Drawing Sheet